United States Patent
Lange et al.

(10) Patent No.: US 8,375,109 B1
(45) Date of Patent: Feb. 12, 2013

(54) SHORTENED DHCP LEASE TIME

(75) Inventors: Andrew Snowden Lange, Culver City, CA (US); Alexey Dmitriyevich Zinin, Cupertino, CA (US)

(73) Assignee: Alcatel Lucent, Paris (FR)

( * ) Notice: Subject to any disclaimer, the term of this patent is extended or adjusted under 35 U.S.C. 154(b) by 433 days.

(21) Appl. No.: 11/701,182

(22) Filed: Jan. 31, 2007

(51) Int. Cl.
   *G06F 15/177* (2006.01)
(52) U.S. Cl. ........................................ 709/221
(58) Field of Classification Search .......... 709/220–222, 709/201–203, 227–229
   See application file for complete search history.

(56) References Cited

U.S. PATENT DOCUMENTS

| | | | |
|---|---|---|---|
| 2003/0147421 A1* | 8/2003 | Gutknecht et al. | 370/468 |
| 2005/0286518 A1* | 12/2005 | Park et al. | 370/389 |
| 2006/0271929 A1* | 11/2006 | Brack et al. | 718/1 |
| 2008/0025299 A1* | 1/2008 | Agarwal et al. | 370/389 |

\* cited by examiner

*Primary Examiner* — Chirag R Patel
(74) *Attorney, Agent, or Firm* — Van Pelt, Yi & James, LLP

(57) ABSTRACT

Storing subscriber state information is disclosed. It is determined whether a subscriber state information associated with a DHCP lease communication is stored in a persistent storage. If the subscriber state information is not stored in the persistent storage, a shortened time that is shorter than a normal DHCP lease time is included in the DHCP lease communication.

42 Claims, 3 Drawing Sheets

SHORTENED DHCP LEASE TIME

BACKGROUND OF THE INVENTION

In many network architectures, information learned via DHCP (Dynamic Host Configuration Protocol) needs to be synchronized between a network service provider's router and the customer premise device. This synchronized information can be used, for example, to create a filter on the service provider's router which prevents one customer from spoofing their source IP address and hiding an attack on another customer.

When a router fails, but the customer premise device does not, a condition can exist where the router loses its record of this information. The customer device, however, because it has not failed, believes this information is still valid. When the router recovers, the customer device will be unable to send any traffic since the router's filter will have lost state and, for example, defaulted back to a secure mode in which all traffic from the customer device is denied because the service router is not aware that the IP address the device is using is valid.

It is known to write DHCP information to persistent storage (e.g. the router's flash drive or other persistent storage) so that subscriber state (e.g., DHCP lease) information can be retrieved from the persistent storage in the event of a power or other failure at the router that results in the in memory store of subscriber state being lost. However, if the persistent storage (e.g., a flash drive, hard disk drive, or other persistent storage) is not fast enough, information can queue up. Such a condition could occur, for example, if the number of subscribers trying to establish and/or reestablish connections and/or the characteristics (e.g., write speed) of the persistent storage were such that subscriber information cannot be written to the persistent storage as fast as it is being added to the queue. If there is a failure while information is queued but not written to the persistent storage, the router can lose that information. Since the information has already been passed to the client, the client thinks that the information is valid, even though the router has no way to know the information is valid because it had not yet been written to the persistent storage used to recover from failures.

Therefore, there is a need for a better way to persist DHCP and/or other subscriber state information to avoid and/or mitigate the effect of any loss of subscriber state information in the event of a failure at the provider's router.

SUMMARY OF THE INVENTION

Storing subscriber state information is disclosed. It is determined whether a subscriber state information associated with a DHCP lease communication is stored in a persistent storage. If the subscriber state information is not stored in the persistent storage, a shortened time that is shorter than a normal DHCP lease time is included in the DHCP lease communication.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rewriting to a relatively short period a DHCP lease time in a DHCP lease communication containing data not yet written to persistent storage is disclosed. In some embodiments, the DHCP lease time is rewritten to cause the DHCP client to request renewal of the DHCP lease after only a short time, e.g., after one half the period to which the DHCP lease term was rewritten. Once the information has been written to persistent storage, the lease term is not rewritten in a subsequent DHCP communication, enabling the client to use the assigned resource (e.g., IP address) or other information for the full period granted by the DHCP server.

Figure 1:
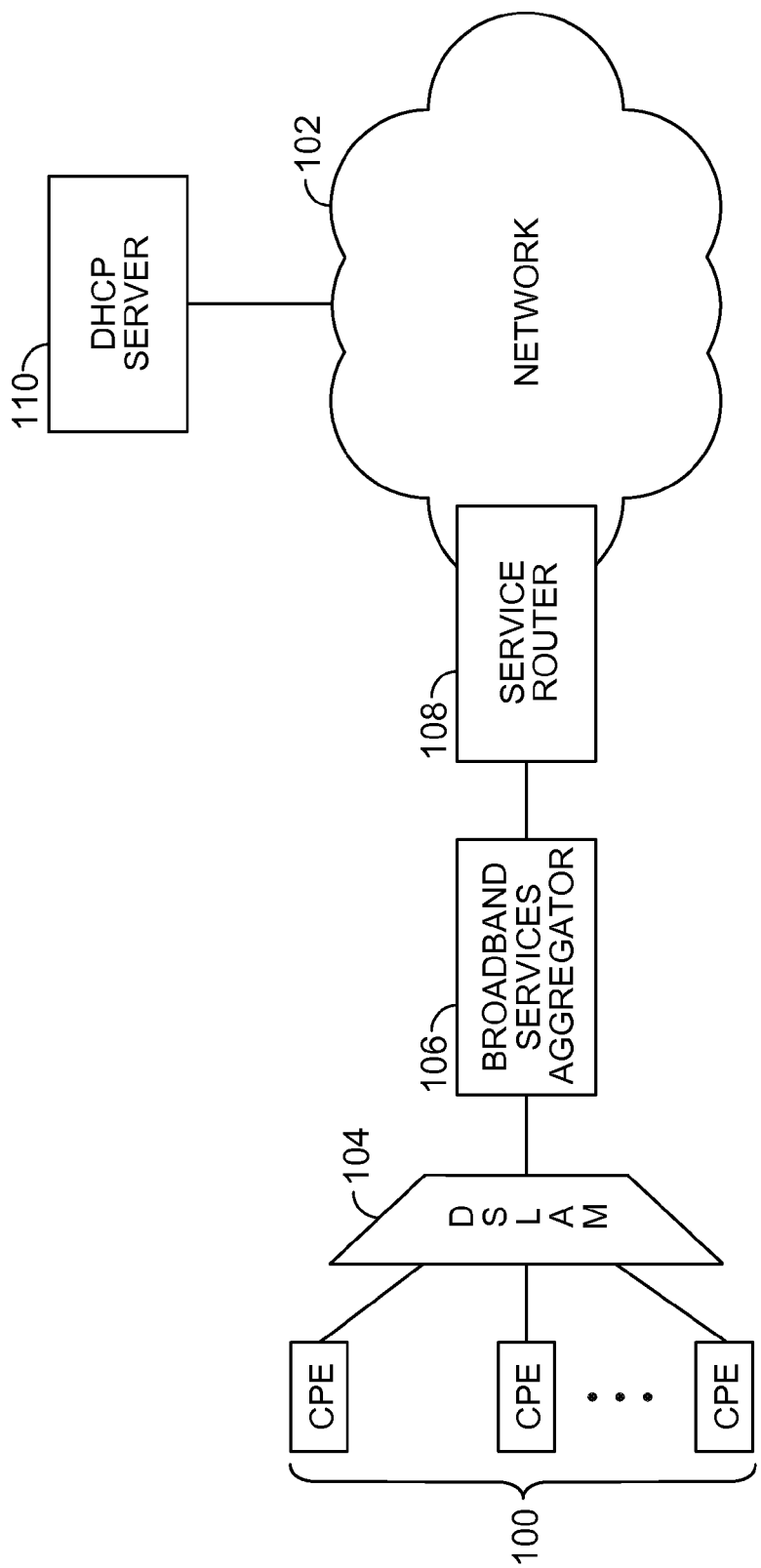
FIG. 1 is a block diagram illustrating an embodiment of a system for providing access to network-based services.

FIG. 1 is a block diagram illustrating an embodiment of a system for providing access to network-based services. A plurality of customer premises equipments 100 access a network 102 via a DSLAM 104, broadband services aggregator (BSA) 106, and service router 108. In some embodiments, BSA 106 is configured to provide access to broadband network services such as voice, video, music or other audio, and other data. In some embodiments, a single BSA such as BSA 106 provides access to multiple DSLAMs and a single service router such as router 108 supports multiple BSAs. In some embodiments, BSA 106 and/or service router 108 are and/or may be configured to provide different and/or varying levels of service to different subscribers and/or subscriber hosts and/or different and/or varying levels of service with respect to different network services, such as different classes or types of data (voice versus other data, for example). In some embodiments, BSA 106 and/or service router 108 derive from DHCP lease communications, as described more fully below, subscriber state information required to provide network services at a level associated with the subscriber, e.g., an applicable quality of service (QoS) and/or other commitment. In some embodiments, a record associating each CPE with its corresponding valid MAC address and/or IP address is maintained at BSA 106 and/or another access node to ensure that a CPE is not used to send to another CPE an IP packet that includes as the source IP and/or MAC address an IP and/or MAC address other than the actual IP and/or MAC address currently valid for that CPE, a function sometime referred to as anti-spoofing filtering.

In some embodiments, BSA 106 comprises an Alcatel-Lucent 7450 Ethernet Services Switch (ESS) and service router 108 comprises an Alcatel-Lucent 7750 Service Router (SR). In some embodiments, the role of the BSA and the SR are collapsed into one device. In some embodiments, the DSLAM is aware of the DHCP exchange and is configured to perform the function described above.

In the example shown, each CPE communicates via network 102 with a Dynamic Host Configuration Protocol (DHCP) server 110 to obtain an IP address to use to communicate via the network 102 using the Internet Protocol (IP). Specifically, a DHCP client installed at the CPE requests an IP address from the DHCP server. Under the Dynamic Host Configuration Protocol, DHCP server 110 grants to a requesting client a "lease" to an IP address for a period of time specified in the lease. In some embodiments, BSA 106 monitors DHCP lease communications between a CPE and the DHCP server 110 and extracts from such communications information required by BSA 106 and/or associated nodes, such as service router 108, to provide network services to the subscriber(s) associated with each respective CPE 100. Such information, sometimes referred to herein as "subscriber state information" includes in various embodiments the IP address that has been assigned to a CPE; a valid lease term and/or expiration time for the corresponding DHCP lease; and "option 82" or a policy, service level, or other information extracted from DHCP lease communications, or to which such information has been mapped, to configure the BSA 106 and/or service router 108 to provide the correct service(s) to the CPE at required levels, e.g., to meet quality of service (QoS) and/or other commitments (sometimes referred to collectively as a "policy").

Figure 2:
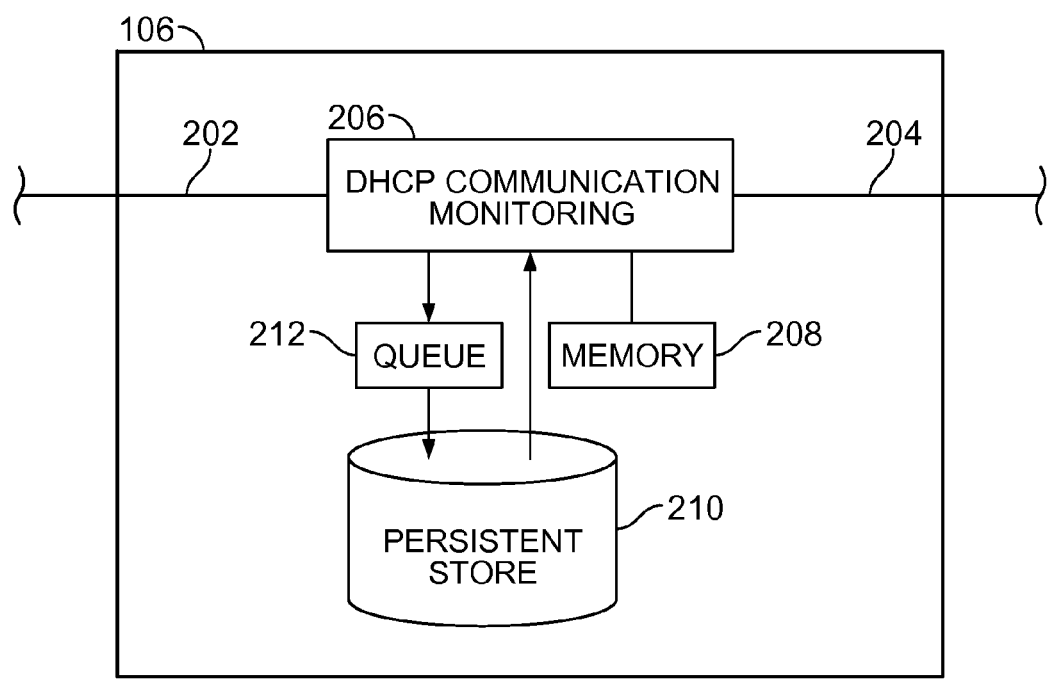
FIG. 2 is a block diagram illustrating an embodiment of a broadband services aggregator.

FIG. 2 is a block diagram illustrating an embodiment of a broadband services aggregator. In the example shown, BSA 106 includes a first communication interface 202 used to communicate with CPEs 100 via DSLAM 104 and a second communication interface 204 to communicate with the service router 108. A DHCP communication monitoring process 206 monitors communications between DHCP clients installed at the CPEs 100 and the DHCP server 110 and extracts from DHCP acknowledgement ("ack") messages the IP address assigned to a CPE and the corresponding lease duration. In some embodiments, such information is used to ensure that valid CPE traffic sent using a currently valid IP address is not blocked by an anti-spoofing filter implemented at the BSA 106. In some embodiments, BSA 106 extracts from DHCP lease communications option 82 and/or other information comprising and/or that is mapped to subscriber state information required by the BSA 106 to provide to each CPE the correct service(s) at the required level. BSA 106 stores subscriber state information in a memory 208 and in addition stores at least a subset of such information persistently in a persistent store 210, such as a flash drive, hard disk drive, or other persistent storage. In the event of a failure, e.g., a loss of power and/or other failure that causes the subscriber state information stored in memory 208 to be lost, the subscriber state information is retrieved from the persistent store 210, enabling BSA 106 to continue to provide and/or resume providing service to the CPEs for which subscriber state information was stored persistently in persistent store 210. However, if the subscriber state information being extracted from monitored DHCP lease communications outpaces the capacity for such information to be written to the persistent store 210, information builds up in a queue 212 of information to be written to the persistent store 210. In the event of a failure at the BSA 106, information that has been placed in queue 212 but not yet written to persistent store 210 may be lost.

Figure 3:
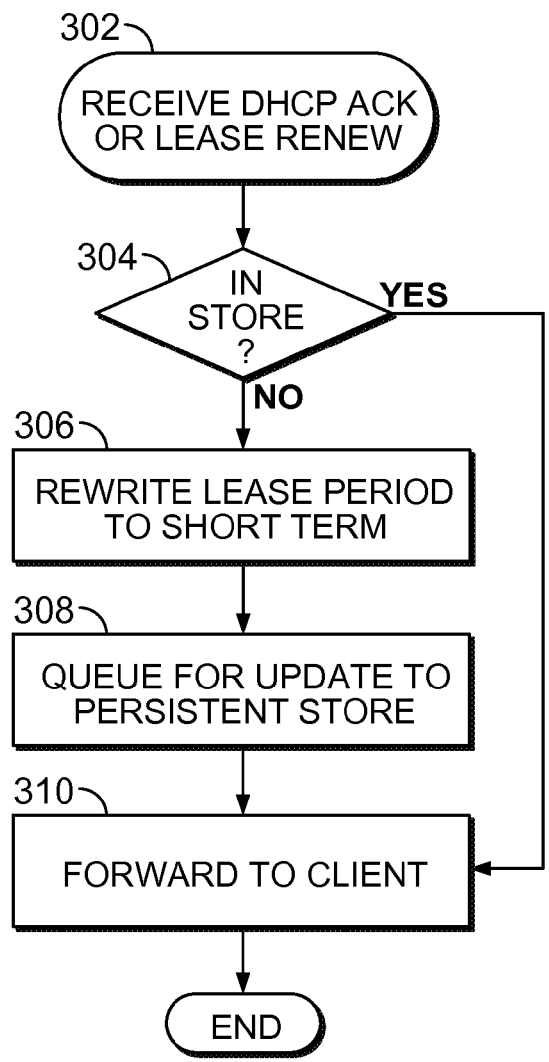
FIG. 3 is a flow chart illustrating an embodiment of a process for rewriting a DHCP lease time if a subscriber state information associated with the DHCP lease communication is not already stored in a persistent storage.

FIG. 3 is a flow chart illustrating an embodiment of a process for rewriting a DHCP lease time if a subscriber state information associated with the DHCP lease communication is not already stored in a persistent storage. In some embodiments, a broadband services aggregator (BSA) or other access node is configured to implement the process of FIG. 3. A DHCP acknowledgement ("ack"), lease renew, or other DHCP lease communication is received (302). If a subscriber state information associated with the DHCP lease communication is already stored in a persistent storage (304), the DHCP communication is forwarded to the DHCP client (310), without modification. For example, in some embodiments if data associating an IP address assigned (or renewed) with the client by the communication and/or an associated lease term and/or expiration time is already stored in the persistent storage, in some embodiments the communication is forwarded to the client without modification. In some embodiments, the determination whether the subscriber state information associated with the DHCP lease communication is already stored in the persistent storage is determined by reading, e.g., in a table or other data structure or record stored in the persistent storage, to see if the subscriber state information is already stored in the persistent storage.

If the subscriber state information associated with the DHCP lease communication is not already stored in a persistent storage (304), a lease period in the DHCP communication is rewritten to a relatively short period (306), the subscriber state information is placed in a queue to be written to the persistent storage (308), and the modified communication (i.e., with the DHCP lease time rewritten) is forwarded to the DHCP client (310), after which the process ends. In various embodiments, the shortened time used for the rewritten lease will depend on factors such as the rate the DHCP server can produce the response, the rate at which the BSA can write the leases to persistent storage, and/or the number of leases that the system may have to deal with. An example scenario would be a case where the DHCP server can serve 1000 leases per second, the BSA can write 200 leases per second into its persistent storage, and there may be up to 10,000 clients requesting leases at the same time due to, for example, a neighborhood power failure. In this case, after 10 seconds, the DHCP server would be done allocating leases. However, the BSA would only have written 2000 leases to its persistent storage. A failure in that instant would result in 8000, or 40 seconds worth, of leases being lost. To mitigate this failure, the BSA could rewrite the lease time to 120-180 seconds. When the client re-requests a lease time in 60-90 seconds (half the lease time), the entire queue on the BSA would be on persistent storage. If there were a failure, the time before the new DHCP exchange resolves the problem would be minimal. In various embodiments, the lease time to which the lease period is rewritten would be determined by network administrators based on the above and/or other considerations, e.g., router reboot time, and may need to be adjusted over time based on operational experience.

In some embodiments, the DHCP lease time is rewritten in a manner that is transparent to the DHCP client, which receives the forwarded communication, as modified to shorten the lease time, without any indication that the communication is other than a normal response from the DHCP server. The DHCP client, through its normal logic and operation, typically will be configured to request renewal of the lease at one half the lease period. In some embodiments, if the subscriber state information is determined to not yet be stored in persistent storage (304), the lease term is rewritten to a few minutes or hours. When the DHCP client requests and is granted renewal, typically for a much longer term, the communication from the DHCP server granting the renewal is not modified so long as the subscriber state information was written successfully to the persistent storage prior to the renewal communication being received at the node implementing the process of FIG. 3.

In certain examples described above the subscriber state information comprises an IP address and associated time of expiration. The techniques described herein may be used to ensure persistent storage of other subscriber state information potentially associated with a DHCP lease communication, including without limitation option 82 information, option 60 information, or any other information contained in the DHCP exchange.

In some embodiments, the BSA, service router, or another node is configured to serve as a DHCP proxy, and in such embodiments, the DHCP proxy is configured to write initially a shorter than usual lease time, until the lease state information has been written to persistent storage.

The techniques described herein avoid the risk that a customer premise equipment or other DHCP client will be denied access to network services for a prolonged period due to failure of a provider's access node prior to associated subscriber state information being stored persistently. While a client may be denied access for the relatively short time before it communicates with the DHCP server to renew its lease, typically at one half the shortened lease period, one can minimize the impact and/or likelihood of such a denial of access through careful selection of the shortened period to which the DHCP lease time is rewritten.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of storing subscriber state information, comprising:
   receiving a DHCP lease communication, wherein the DHCP lease communication originated from a DHCP server and is destined for a DHCP client;
   determining whether a subscriber state information extracted from the received DHCP lease communication is stored in a persistent storage; and
   in the event it is determined that the subscriber state information is not stored in the persistent storage, including in the DHCP lease communication a shortened time that is shorter than a normal time that would otherwise be included in the DHCP lease communication and place the subscriber state information in a queue to be written to the persistent storage, wherein including the shortened time in the DHCP lease communication comprises rewriting an original lease time specified originally in the DHCP lease communication to the shortened time;
   in the event it is determined that the subscriber state information is stored in the persistent storage, forwarding the DHCP lease communication with the original lease time in the DHCP lease communication;
   wherein the persistent storage is a data storage that is configured to retain the data stored in it in event of a power failure.

2. A method as recited in claim 1, further comprising forwarding the modified DHCP lease communication to the DHCP client in the event it is determined that the subscriber state information is not stored in the persistent storage.

3. A method as recited in claim 1, wherein the DHCP lease communication is forwarded to the DHCP client without rewriting the lease time in the event it is determined that the subscriber state information is stored in the persistent storage.

4. A method as recited in claim 1, further comprising writing the subscriber state information to the persistent storage in the event it is determined that the subscriber state information is not stored in the persistent storage.

5. A method as recited in claim 1, wherein the subscriber state information is included in the DHCP lease communication.

6. A method as recited in claim 1, wherein the subscriber state information comprises an IP address, a MAC address, or both.

7. A method as recited in claim 1, wherein the subscriber state information comprises a DHCP option 82 data associated with the DHCP lease communication.

8. A method as recited in claim 1, wherein the subscriber state information comprises a policy determined based at least in part on a DHCP option 82 data associated with the DHCP lease communication.

9. A method as recited in claim 1, wherein the DHCP lease communication is received from the DHCP server.

10. A method as recited in claim 1, wherein the DHCP lease communication is addressed to the DHCP client.

11. A method as recited in claim 1, wherein including the shortened time in the DHCP lease communication comprises rewriting an original lease time specified originally in the DHCP lease communication to the shortened time and the lease time is rewritten in a manner that is transparent to the DHCP client.

12. A method as recited in claim 1, wherein the persistent storage comprises a flash drive, hard disk drive, or other form of persistent storage.

13. A method as recited in claim 1, wherein the persistent storage is included in a broadband services aggregator.

14. A method as recited in claim 1, wherein the DHCP lease communication is received at a node on a communication path intermediate of the DHCP server and the DHCP client.

15. A provider network access device, comprising:
   a communication interface configured to receive a DHCP lease communication, wherein the DHCP lease communication originated from a DHCP server and is destined for a DHCP client;
   a persistent storage configured to store for each of a set of one or more subscribers a corresponding subscriber state information; and
   a processor coupled to the persistent storage and configured to:
      determine whether a subscriber state information extracted from the received DHCP lease communication is stored in the persistent storage; and
      in the event it is determined that the subscriber state information is not stored in the persistent storage, include in the DHCP lease communication a shortened time that is shorter than a normal time that would otherwise be included in the DHCP lease communication and place the subscriber state information in a queue to be written to the persistent storage, wherein to include the shortened time in the DHCP lease communication comprises rewriting an original lease time specified originally in the DHCP lease communication to the shortened time;

in the event it is determined that the subscriber state information is stored in the persistent storage, forwarding the DHCP lease communication with the original lease time in the DHCP lease communication;

wherein the persistent storage is a data storage that is configured to retain the data stored in it in event of a power failure.

16. A device as recited in claim 15, wherein the persistent storage comprises a flash drive, hard disk drive, or other form of persistent storage.

17. A device as recited in claim 15, wherein the persistent storage and the processor comprise a broadband services aggregator or router.

18. A device as recited in claim 15, wherein the processor is further configured to forward the modified DHCP lease communication to the DHCP client in the event it is determined that the subscriber state information is not stored in the persistent storage.

19. A device as recited in claim 15, wherein the processor is configured to forward the DHCP lease communication to the DHCP client without rewriting the lease time in the event it is determined that the subscriber state information is stored in the persistent storage.

20. A device as recited in claim 15, wherein the processor is further configured to write the subscriber state information to the persistent storage in the event it is determined that the subscriber state information is not stored in the persistent storage.

21. A device as recited in claim 15, wherein the subscriber state information is included in the DHCP lease communication.

22. A device as recited in claim 15, wherein the subscriber state information comprises an IP address, a MAC address, or both.

23. A device as recited in claim 15, wherein the subscriber state information comprises a DHCP option 82 data associated with the DHCP lease communication.

24. A device as recited in claim 15, wherein the subscriber state information comprises a policy determined based at least in part on a DHCP option 82 data associated with the DHCP lease communication.

25. A device as recited in claim 15, wherein the DHCP lease communication is received from the DHCP server.

26. A device as recited in claim 15, wherein the DHCP lease communication is addressed to the DHCP client.

27. A device as recited in claim 15, wherein including the shortened time in the DHCP lease communication comprises rewriting an original lease time specified originally in the DHCP lease communication to the shortened time and the lease time is rewritten in a manner that is transparent to the DHCP client.

28. A computer program product for storing subscriber information, the computer program product being embodied in a non-transitory computer readable storage medium and comprising computer instructions for:
   receiving a DHCP lease communication, wherein the DHCP lease communication originated from a DHCP server and is destined for a DHCP client;
   determining whether a subscriber state information extracted from the received DHCP lease communication is stored in a persistent storage; and
   in the event it is determined that the subscriber state information is not stored in the persistent storage, including in the DHCP lease communication a shortened time that is shorter than a normal time that would otherwise be included in the DHCP lease communication and place the subscriber state information in a queue to be written to the persistent storage, wherein including the shortened time in the DHCP lease communication comprises rewriting an original lease time specified originally in the DHCP lease communication to the shortened time;
   in the event it is determined that the subscriber state information is stored in the persistent storage, forwarding the DHCP lease communication with the original lease time in the DHCP lease communication;

wherein the persistent storage is a data storage that is configured to retain the data stored in it in event of a power failure.

29. A device as recited in claim 15, wherein the device resides on a node on a communication path intermediate of the DHCP server and the DHCP client.

30. A computer program product as recited in claim 28, wherein the DHCP lease communication is received at a node on a communication path intermediate of the DHCP server and the DHCP client.

31. A computer program product as recited in claim 28, wherein the persistent storage comprises a flash drive, hard disk drive, or other form of persistent storage.

32. A computer program product as recited in claim 28, wherein the persistent storage is included in a broadband services aggregator.

33. A computer program product as recited in claim 28, further comprising forwarding the modified DHCP lease communication to the DHCP client in the event it is determined that the subscriber state information is not stored in the persistent storage.

34. A computer program product as recited in claim 28, wherein the DHCP lease communication is forwarded to the DHCP client without rewriting the lease time in the event it is determined that the subscriber state information is stored in the persistent storage.

35. A computer program product as recited in claim 28, further comprising writing the subscriber state information to the persistent storage in the event it is determined that the subscriber state information is not stored in the persistent storage.

36. A computer program product as recited in claim 28, wherein the subscriber state information is included in the DHCP lease communication.

37. A computer program product as recited in claim 28, wherein the subscriber state information comprises an IP address, a MAC address, or both.

38. A computer program product as recited in claim 28, wherein the subscriber state information comprises a DHCP option 82 data associated with the DHCP lease communication.

39. A computer program product as recited in claim 28, wherein the subscriber state information comprises a policy determined based at least in part on a DHCP option 82 data associated with the DHCP lease communication.

40. A computer program product as recited in claim 28, wherein the DHCP lease communication is received from the DHCP server.

41. A computer program product as recited in claim 28, wherein the DHCP lease communication is addressed to the DHCP client.

42. A computer program product as recited in claim 28, wherein including the shortened time in the DHCP lease communication comprises rewriting an original lease time specified originally in the DHCP lease communication to the shortened time and the lease time is rewritten in a manner that is transparent to the DHCP client.

* * * * *